US011293333B2

(12) United States Patent
Frick et al.

(10) Patent No.: US 11,293,333 B2
(45) Date of Patent: Apr. 5, 2022

(54) CONTROL SYSTEM AND METHOD USING MULTIPLE INPUTS FOR CONTROLLING COOLING FAN SPEED OF OUTDOOR POWER EQUIPMENT UNIT

(71) Applicant: The Toro Company, Bloomington, MN (US)

(72) Inventors: Alexander S. Frick, Farmington, MN (US); Peter M. Arendt, Richfield, MN (US); Jesse R. Gamble, Burnsville, MN (US)

(73) Assignee: The Toro Company, Bloomington, MN (US)

( * ) Notice: Subject to any disclaimer, the term of this patent is extended or adjusted under 35 U.S.C. 154(b) by 760 days.

(21) Appl. No.: 15/215,758

(22) Filed: Jul. 21, 2016

(65) Prior Publication Data

US 2017/0022878 A1 Jan. 26, 2017

Related U.S. Application Data

(60) Provisional application No. 62/195,944, filed on Jul. 21, 2015.

(51) Int. Cl.
| | | |
|---|---|---|
| *F01P 7/12* | (2006.01) | |
| *F01P 5/02* | (2006.01) | |
| *F01P 11/08* | (2006.01) | |
| *A01D 34/80* | (2006.01) | |
| *A01D 69/00* | (2006.01) | |

(52) U.S. Cl.
CPC ............... *F01P 7/12* (2013.01); *A01D 34/80* (2013.01); *A01D 69/005* (2013.01); *F01P 5/02* (2013.01); *F01P 11/08* (2013.01); *F01P 2037/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,082,971 A | * | 7/2000 | Gunn | F04B 39/066 |
| | | | | 417/32 |
| 6,349,882 B1 | * | 2/2002 | Kita | F01P 7/044 |
| | | | | 236/34 |
| 8,459,959 B2 | * | 6/2013 | Imaizumi | E02F 9/00 |
| | | | | 417/42 |

(Continued)

*Primary Examiner* — Lindsay M Low
*Assistant Examiner* — Ruben Picon-Feliciano
(74) *Attorney, Agent, or Firm* — James W. Miller

(57) ABSTRACT

An outdoor unit has a frame that carries a ground grooming or working implement, a traction drive, and a cooling fan, all of which comprises loads on a prime mover. A power management controller automatically reduces an operational speed of the traction drive when prime mover droop is present. The cooling fan cools two cooling fluids. The controller stores data representing variable fan speeds for cooling each cooling fluid in both normal and above normal temperature ranges and for use when prime mover droop is present. The controller uses the highest fan speed required for cooling the cooling fluids in the normal range unless the droop fan speed is lower in which case the lower droop fan speed is used but only to the extent that the lower droop fan speed is not lower than the highest fan speed required for cooling the cooling fluids in the above normal temperature range.

9 Claims, 6 Drawing Sheets

(56) References Cited

U.S. PATENT DOCUMENTS

| | | | | |
|---|---|---|---|---|
| 8,955,472 B2* | 2/2015 | Shintani | ............... | E02F 9/2025 123/41.12 |
| 2011/0298286 A1* | 12/2011 | Batzler | .................... | H02J 3/14 307/41 |
| 2014/0069072 A1* | 3/2014 | Gamble | ............... | A01D 34/006 56/10.2 A |

* cited by examiner

CONTROL SYSTEM AND METHOD USING MULTIPLE INPUTS FOR CONTROLLING COOLING FAN SPEED OF OUTDOOR POWER EQUIPMENT UNIT

TECHNICAL FIELD

This invention relates to outdoor power equipment units which are self-propelled by a prime mover such as an internal combustion engine. More particularly, this invention relates to a control system for maximizing the efficient use of engine horsepower over widely varying load conditions.

BACKGROUND OF THE INVENTION

U.S. Pat. No. 8,880,300 to Gamble et al. is assigned to The Toro Company, the assignee of this invention. Gamble discloses a power management system for an outdoor power equipment unit, such as a riding mower, that seeks to efficiently use the available horsepower provided by the engine to ensure the ability of the unit to properly perform its work operation, namely to maintain the quality of cut when the unit comprises a mower. In high to extreme load conditions when the available engine horsepower is insufficient to both maintain the ground speed of the unit and to properly conduct the work operation, the power management system in Gamble automatically reduces the ground speed of the unit, thereby lowering the engine load imposed by the traction drive system, to allow the implements conducting the work operation to remain fully functional. In addition, a cooling fan on the unit used to cool at least one liquid, either an engine coolant liquid used or hydraulic oil used in a hydraulic system on the unit or both, may also be additionally shut off to further reduce the engine load. While the Gamble system is effective for its intended purposes, it would be a further advance in the art to provide more sophisticated and nuanced control of the cooling fan than simply shutting the cooling fan off.

SUMMARY OF THE INVENTION

One aspect of this invention relates to an outdoor power equipment unit which comprises a frame. The frame carries a prime mover, a ground grooming or working implement, a traction drive, and a cooling fan, all of which comprise loads on the prime mover. The cooling fan cools at least one fluid. A power management controller is provided on the frame. The controller further stores data representing variable fan speeds for use in cooling each fluid in normal and above temperature ranges thereof and for use when prime mover load above a predetermined value is present. The controller uses a highest fan speed required for cooling each fluid in the normal temperature range unless the prime mover load fan speed is lower in which case the lower prime mover load fan speed is used but only to the extent that the lower prime mover load fan speed is not lower than a highest fan speed required for cooling each fluid in the above normal temperature range.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
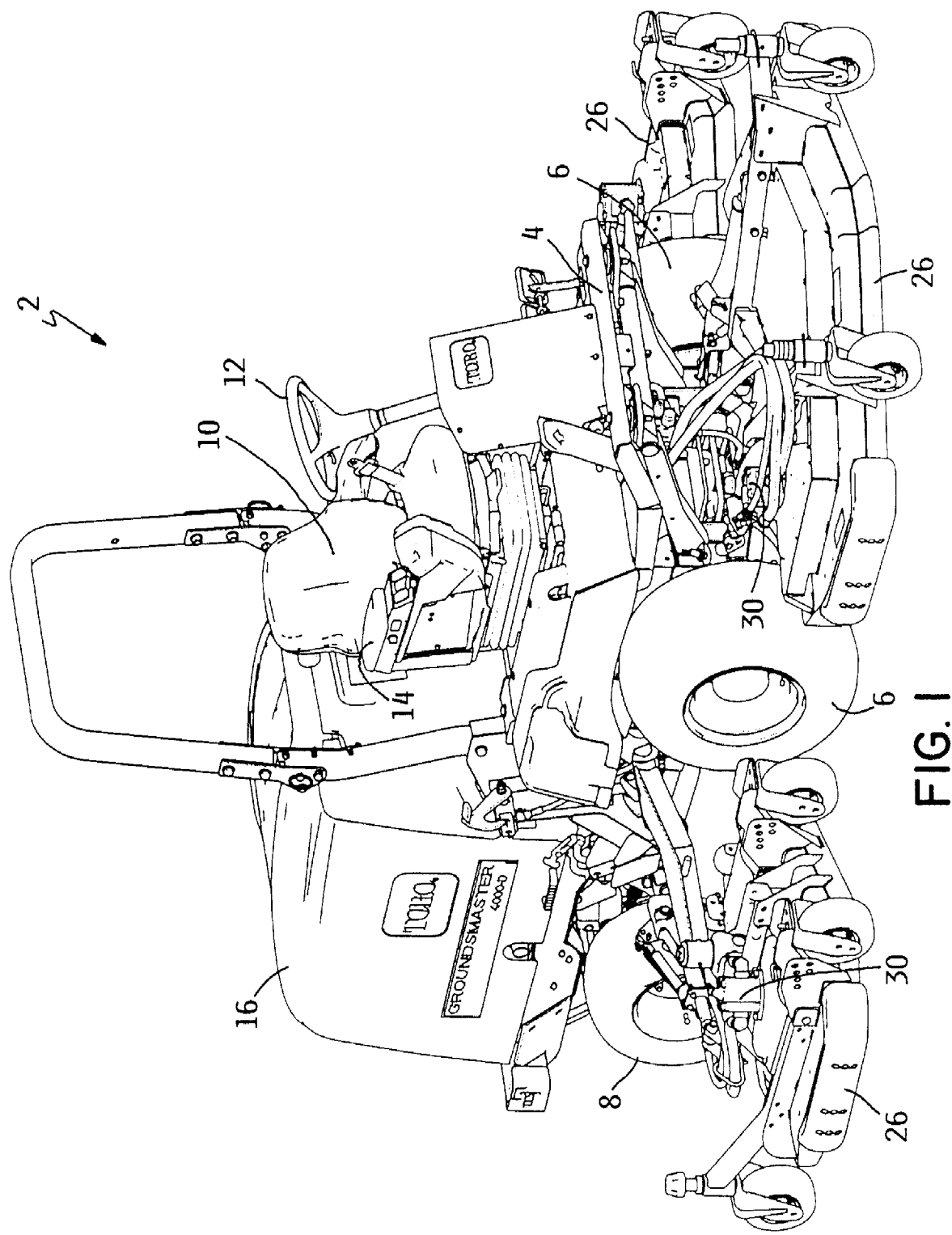
FIG. 1 is a perspective view of one type of outdoor power equipment unit, namely a self-propelled mower, with which the control system and method of this invention may be used.

FIG. 1 is a perspective view of one type of outdoor power equipment unit that may effectively utilize the control system and method of this invention. The specific outdoor power equipment unit shown in FIG. 1 comprises a mower 2. Mower 2 includes a frame 4 that is supported for movement over the ground by a pair of front wheels 6 and a pair of rear wheels 8. Frame 4 includes an operator's station having a seat 10 for supporting a seated operator, a steering wheel 12 that the operator uses to steer and guide mower 2, and a control console 14 having various controls for controlling the operation of various components of mower 2. Frame 4 also carries an internal combustion engine (not shown) that is positioned behind the operator's station and that is enclosed within an engine cowl or hood 16.

Mower 2 includes a traction drive system for causing mower 2 to be self-propelled across the ground. In one embodiment thereof, the traction drive system operates to rotate the pair of front wheels 6 such that front wheels 6 are the drive wheels. Rear wheels 8 could be unpowered in a 2WD configuration or powered in a 4WD configuration. In either event, rear wheels 8 are operatively connected to steering wheel 12 to comprise the steerable wheels of mower 2. The traction drive system includes at least one hydraulic variable displacement traction drive pump that powers at least one hydraulic traction drive motor (not shown) for operating front drive wheels 6 (as well as rear wheels 8 if a 4WD configuration is used). If a single traction drive motor fed by a single traction drive pump is used, such a drive motor may be operatively connected to both front drive wheels 6 through a differential having a pair of output shafts or axles that mount the drive wheels. The traction drive pump, the traction drive motor and the differential are often integrated together within a common housing with the combination thereof being known as a hydrostatic transmission. In any event, any hydraulic pump used for traction drive purposes may be operatively coupled through a drive train to the engine.

The outdoor power equipment unit with which this invention is intended to be used also includes at least one work implement for performing a work operation. Since the example of such a unit disclosed herein is a mower, the at least one work implement in this case comprises a plurality of rotary mower decks 26 that are carried by frame 4 of mower 2 as best shown in FIG. 1. Each mower deck 26 encloses one or more grass cutting blades that rotate about vertical axes in substantially horizontal cutting planes. Each mower deck 26 has a cutting blade drive system for rotating such cutting blades. While different types of cutting blade drive systems could be used, in the mower embodiment disclosed herein the cutting blade drive system includes at least one hydraulic blade drive motor 30 on each mower deck.

Mower 2 is provided with at least one cooling fan 32 for cooling both the engine coolant fluid as well as the hydraulic fluid used in the various hydraulic drive systems, such as the traction drive system and the cutting blade drive systems, provided on mower 2. The hydraulic fluid used in the various hydraulic drive systems typically is supplied from a common reservoir of hydraulic fluid carried on frame 4. Cooling fan 32 is rotated by at least one hydraulic fan drive motor (not shown) to draw cooling air through screen portions of engine hood 16 and to send such cooling air over and/or through a pair of stacked heat exchangers (not shown). One heat exchanger is used to cool the engine coolant fluid and the other heat exchanger is used to cool the hydraulic fluid. The fan drive motor that powers cooling fan 32 is supplied with hydraulic fluid from a fan drive hydraulic pump (not shown) that is also driven by the engine.

Mower 2 as described above is set forth more fully in U.S. Pat. No. 8,880,300 to Gamble et al. which is assigned to The Toro Company, the assignee of this invention. U.S. Pat. No. 8,880,300 to Gamble et al. is hereby incorporated by reference as to the structural and operational details of the engine power management system disclosed therein, which system automatically slows the traction drive system and/or shuts off the cooling fan to reduce or remove their loads from the engine when engine load is high and threatens to exceed the available engine horsepower. This allows the available engine horsepower to be used to continue to operate the blades in the cutting decks at their normal operational speed to maintain the quality of cut of the mower. The reader hereof should refer to the Gamble patent for a more complete description of how this engine power management system works.

Figure 2:
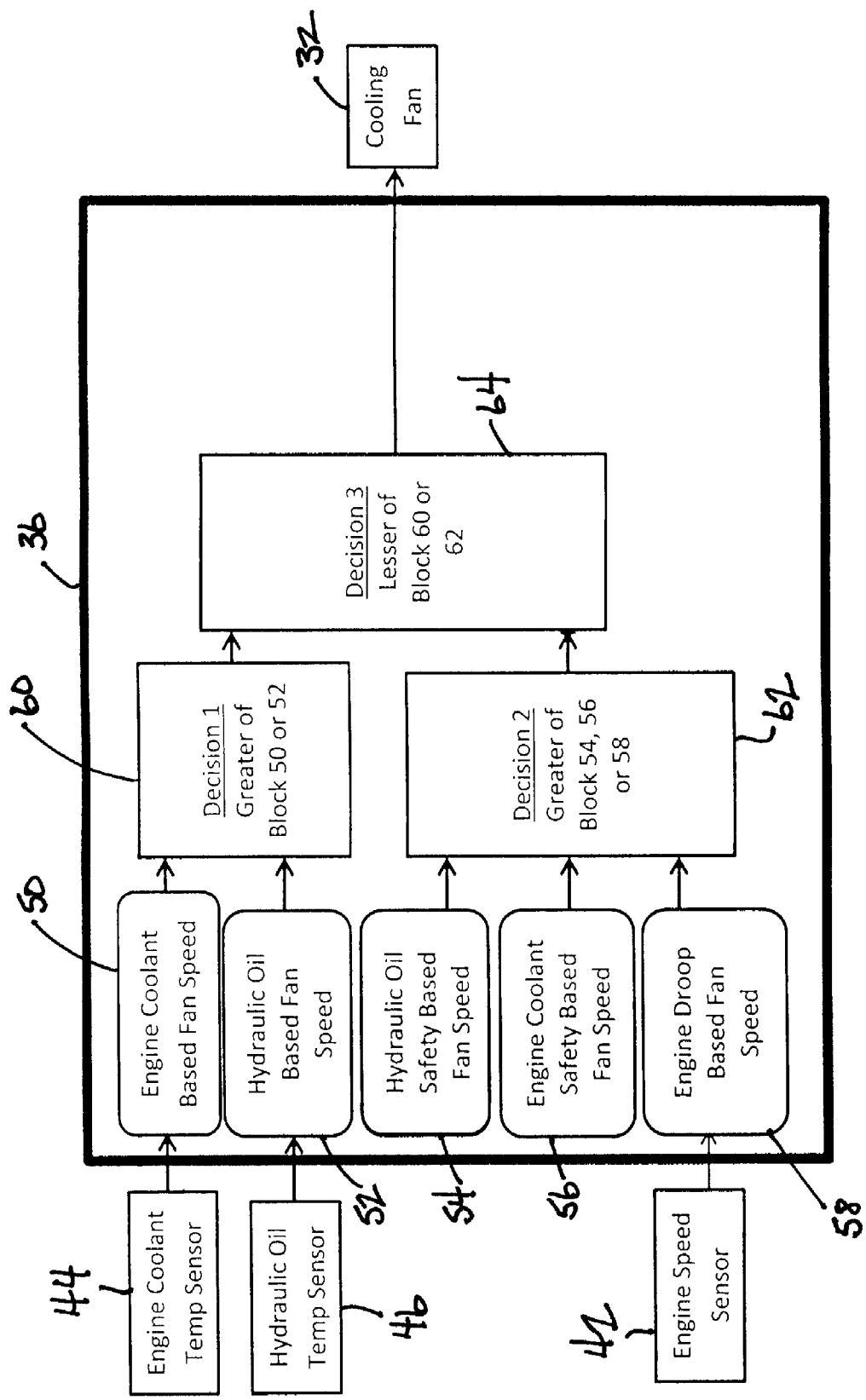
FIG. 2 is a schematic view of a first embodiment of the control system of this invention as applied to the outdoor power equipment unit shown in FIG. 1, including a flow chart illustrating the operational steps of the method performed by the control system of this invention with such flow chart being shown inside the schematically depicted electronic controller of this invention.

One embodiment of the control system and control method of this invention, which is an improvement to the power management system in the Gamble patent in the form of more sophisticated control of cooling fan 32, is best described with reference to FIGS. 2-4 hereof. Referring first to FIG. 2, the control system comprises a microprocessor based electronic controller 36 that is carried on frame 4 of mower 2 and that is powered from the electrical system of mower 2. Controller 36 receives various mower operational inputs. These inputs include two inputs that comprise the actual (i.e. instantaneous) rotational speed of the engine as reported by an engine speed sensor 42 and the actual temperature of the engine coolant fluid contained in the engine cooling system as reported by an engine coolant fluid temperature sensor 44. A third input comprises another temperature input to controller 36 that comes from a hydraulic temperature sensor 46 that senses and reports to controller 36 the actual temperature of the hydraulic oil used in the various hydraulic systems found on mower 2, including, but not limited to, the traction, blade, and fan drive hydraulic systems and the hydraulic deck lift and lower system. These three data inputs are used in combination with fan speed diagrams or tables stored in the memory of controller 36 as the basis for finer and more effective control of the rotational speed of cooling fan 32 in the context of the power management system of the Gamble patent, which has been previously incorporated by reference herein.

Figure 3:
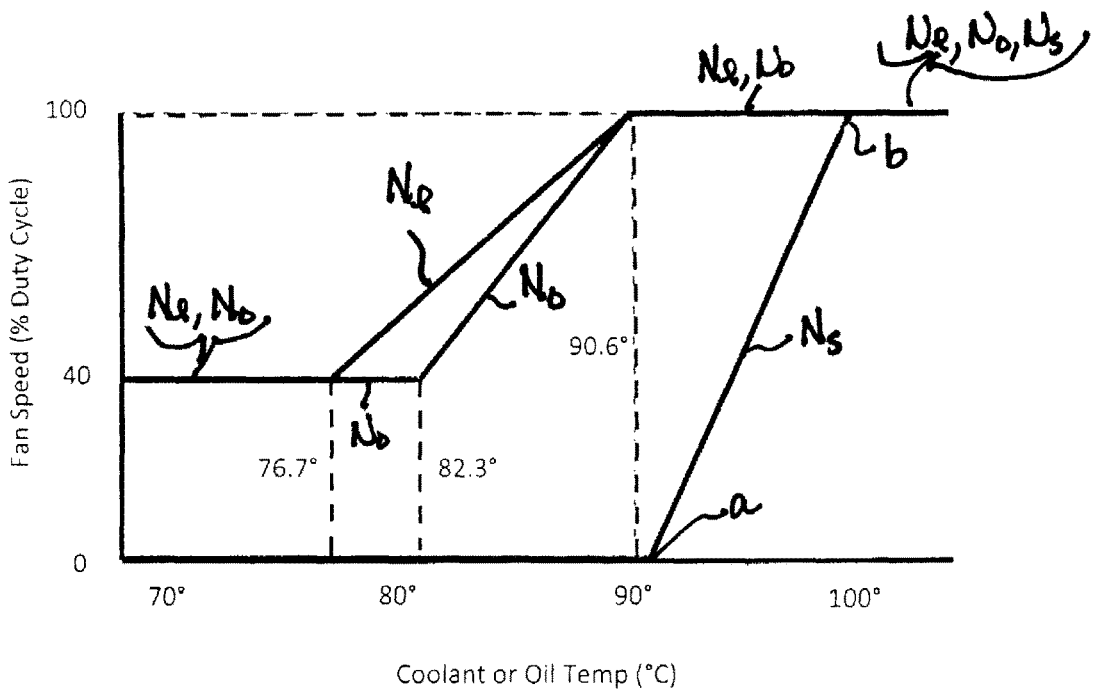
FIG. 3 is a diagram illustrating various relationships between fan speed and the temperatures of the engine coolant liquid and the hydraulic oil used in a hydraulic system for both normal operational conditions and high temperature safety conditions as used in the embodiment of FIG. 2.

FIG. 3 is a diagram that illustrates the relationship between fan speed, expressed as a percentage of speed from an off condition to a full speed condition, and the temperatures, expressed in degrees Centigrade (° C.), of the engine coolant liquid and the hydraulic oil. Line $N_e$ in FIG. 3 contains the speed/temperature relationship for the engine coolant liquid assuming normal operation of mower 2 and fairly normal temperatures for the engine coolant liquid. Line $N_o$ in FIG. 3 contains the speed/temperature relationship for the hydraulic oil assuming normal operation of mower 2 and fairly normal temperatures for the hydraulic oil. Line $N_s$ in FIG. 3 contains a speed/temperature relationship that applies either to the engine coolant liquid or the hydraulic oil, but assumes a high temperature condition in either fluid that would most likely occur in some type of abnormal operation of mower 2 with a potential possibility of damage to the engine or hydraulic systems on mower 2 unless the high temperature condition were corrected. The subscript s in the line $N_s$ is intended to refer to "safety" as it represents a speed/temperature relationship that must be invoked for safety reasons to prevent or minimize the changes of damaging mower 2 by continued operation of mower 2.

Referring to the lines $N_e$ and $N_o$, as long as the temperatures of their respective fluids are below a predetermined low temperature, i.e. approximately 77° C. in the case of line $N_e$ and approximately 82° C. in the case of line $N_o$, the fan speed that is called for is 40% of full speed. Referring further to the lines $N_e$ and $N_o$, when the temperatures of their respective fluids reach a predetermined high temperature, i.e. approximately 91° C. in the case of both lines $N_e$ and $N_o$, the fan speed that is called for is full speed, namely 100% of the fan's duty cycle. Each line $N_e$ and $N_o$ exhibits a linear change relationship in which the fan speed is proportionally increased from 40% of full speed to full speed in the portions of lines $N_e$ and $N_o$ that extend between their predetermined low and high temperatures. It is only in the linear change areas that the lines $N_e$ and $N_o$ diverge from one another since their predetermined low temperatures are different from one another as is apparent from FIG. 3.

Referring now to the safety line $N_s$, this line effectively calls for zero fan speed, i.e. a fan that is completely shut off, until the temperature of either fluid, either the engine coolant liquid or the hydraulic oil, reaches a third temperature at point a of line $N_s$, approximately 93° C., that is even higher than the high temperature of approximately 91° C. at which the lines $N_e$ and $N_o$ would be calling for full fan speed. Then, in a relatively short additional temperature rise of only approximately 6° C. from point a to point b with point b representing approximately 99° C., line $N_s$ ramps the fan speed up in a proportional linear change from zero at point a to full speed at point b.

The use of the various fan speeds called for in lines $N_e$, $N_o$ and $N_s$ will be discussed more fully hereafter in conjunction with the flow chart set forth in FIG. 2. Note that the beginning fan speed values of the lines $N_e$, $N_o$ and $N_s$ along the vertical axis of FIG. 3, the temperature values which mark transition points of the lines $N_e$, $N_o$ and $N_s$ along the horizontal axis of FIG. 3, as well as the shapes and the slopes of the lines $N_e$, $N_o$ and $N_s$ in FIG. 3 are exemplary and non-limiting. Taking line $N_e$ in FIG. 3 as an example, the beginning fan speed value along the vertical axis could be either higher or lower than the 40% that is shown in FIG. 3, the temperature value along the horizontal axis where the fan speed begins to ramp up to 100% could be either higher or lower than the approximately 77° C. that is shown in FIG. 3, and the slope of line $N_e$ in FIG. 3 could be less inclined or more inclined such that the temperature value along the horizontal axis where the fan speed reaches 100% could be either higher or lower than the approximately 91° C. that is shown in FIG. 3. Moreover, in the fan speed transition zone of line $N_e$ between 40% and 100% of fan speed, the line $N_e$ need not necessarily go up in a linear, infinite fashion but could rise in a stair-step fashion with changes in the fan speed occurring in incremental steps (e.g. 5 rpm). The fan speed transition zone of line $N_e$ could also be a combination of a linear section and a stair-step section. The same can be true for the other lines $N_o$ and $N_s$ contained in FIG. 3.

Figure 4:
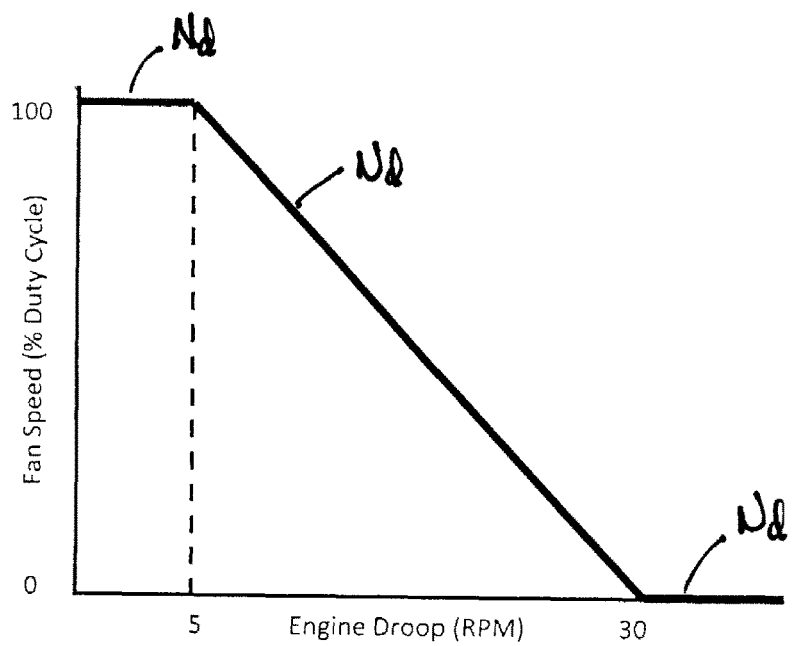
FIG. 4 is a diagram illustrating the relationship between fan speed and sensed engine droop as used in the embodiment of FIG. 2.

FIG. 4 is a diagram that illustrates the relationship between fan speed, expressed as a percentage of speed from an off condition to a full speed condition, and engine droop, expressed as revolutions per minute (rpm) of the engine of mower 2. Engine droop is defined as the amount by which the instantaneous speed of the engine, as reported to controller 36 by engine speed sensor 42, is below a predetermined target speed. Generally, engine droop is caused when engine load begins to exceed the available horsepower. Thus, a calculation of engine droop is representative of excessive engine load, with the amount of excessive engine load increasing as the amount of engine droop increases.

Referring to the line $N_d$ in FIG. 4, with the subscript d standing for droop, if there is no engine droop, meaning that the instantaneous engine speed is at or above the target speed, then line $N_d$ calls for no reduction in the fan speed such that full speed of cooling fan 32 would be set. However, after a small amount of droop to a threshold level of approximately 5 rpm, line $N_d$ then calls for a linear, proportional reduction in the fan speed as the engine droop increases to a second higher level of approximately 30 rpm. At this second higher level of engine droop, the fan speed that would be called for by line $N_d$ is now set to zero speed. Thus, in a relatively short range of engine droop, from 5 rpm to 30 rpm, the fan speed is ramped down from full speed to being off. Obviously, the beginning and ending engine droop values and the range of droop between them for the line $N_d$ can vary over what is shown in FIG. 4. Nonetheless, this rather rapid reduction in the fan speed allows the engine power that the fan was using to be used elsewhere on mower 2. Preferably, line $N_d$ is effective in reducing the speed of cooling fan 32 to zero before the other aspect of the power management system of Gamble, namely the reduction in the traction speed, begins. It is preferred that any traction speed reduction be initiated by an engine droop value, e.g. 50 rpm, that exceeds the range of droop over which line $N_d$ is effective.

Referring now to FIG. 2 again, the overall interplay of all the different fan speeds being called for by the various lines $N_e$, $N_o$, $N_s$ and $N_d$ will be described in a prioritization scheme set forth in the flow chart illustrated inside controller 36. Basically, this flow chart determines at any given time which fan speed controller 36 will set for cooling fan 32 with such fan speed remaining in effect until a change in fan speed is determined to be required by controller 36.

Turning to the flow chart shown in FIG. 2, blocks 50 and 52 each set a fan speed that is established by the temperature of the engine coolant fluid or by the temperature of the hydraulic oil as determined by the lines $N_e$ and $N_o$ in FIG. 3. In some circumstances, the fan speeds may be the same, such as when both lines $N_e$ and $N_o$ are calling for either 40% of full speed or full speed. In other cases, when one or both of the lines $N_e$ and $N_o$ are in the linear change area of FIG. 3, the fan speeds being called for may be different. In block 60, a first decision is made to use the greater or highest of these two fan speeds when the fan speeds are different from one another. If the fan speeds are the same as one another, block 60 would obviously use the value of the common fan speed.

Blocks 54 and 56 in the flow chart in FIG. 2 use the safety fan speed that would be generated by the line $N_s$ in FIG. 3. Since this line applies to both the engine coolant fluid and the hydraulic oil, the temperatures of both fluids are separately read against line $N_s$ to determine if either fluid has entered into the high temperature regime that is at or above approximately 93° C. In this event, a safety fan speed will be mandated by line $N_s$ with the safety fan speed ramping linearly up from zero speed at approximately 93° C. to full speed at approximately 99° C. and remaining at full speed thereafter at higher temperatures. The two safety fan speeds determined in blocks 54 and 56 are sent to a further decision block 62, in which a second fan speed decision will be made.

However, there is one final input into decision block 62, and that is the engine droop fan speed that would be generated by the amount of engine droop according to the line $N_d$ in FIG. 4. If the engine of mower 2 has entered into a high or excessive load condition, then the line $N_d$ might be calling for a reduced fan speed including a fan speed that has been reduced all the way to zero. This engine droop fan speed as determined in block 58 is also fed into decision block 62 along with the two safety fan speeds. Block 62 then compares the various fan speeds that it has received, and will select for use the greater or highest of such fan speeds.

Finally, the fan speeds chosen in blocks 60 and 62 are then input into a final decision block 64, in which the lesser or the smallest fan speed is selected for use. Controller 36 will then send a signal that corresponds to the selected fan speed from block 64 to cooling fan 32 to rotate cooling fan 32 at such speed. Controller 36 repeats this control process in a continuous loop to vary the rotational speed of cooling fan 32 as temperature and load conditions continuously change during the operation of mower 2. Thus, at times cooling fan 32 may be operating at full speed, at other times cooling fan 32 may be shut off when engine load is very high and temperatures in the coolant systems are low or moderate, and at other times cooling fan 32 may be operated at speeds somewhere between zero speed and full speed. Basically, cooling fan 32 will be operated at the speed determined in decision block 60 by the highest fan speed required by either the engine coolant fluid or the hydraulic oil. However, the fan speed from block 60 may be reduced to the engine droop fan speed but only to the extent the safety based fan speeds permit this reduction.

The control system and method of this invention permits much more effective use of cooling fan 32 in terms of being able to slow or stop cooling fan 32 and thereby shed load from the engine to allow more power to be used elsewhere on mower 2 without endangering the safe operation of mower 2 and the integrity of its various fluid cooling systems. This is advantageous when high or extreme load conditions would otherwise degrade the performance of the work implements carried on the outdoor power equipment.

Figure 5:
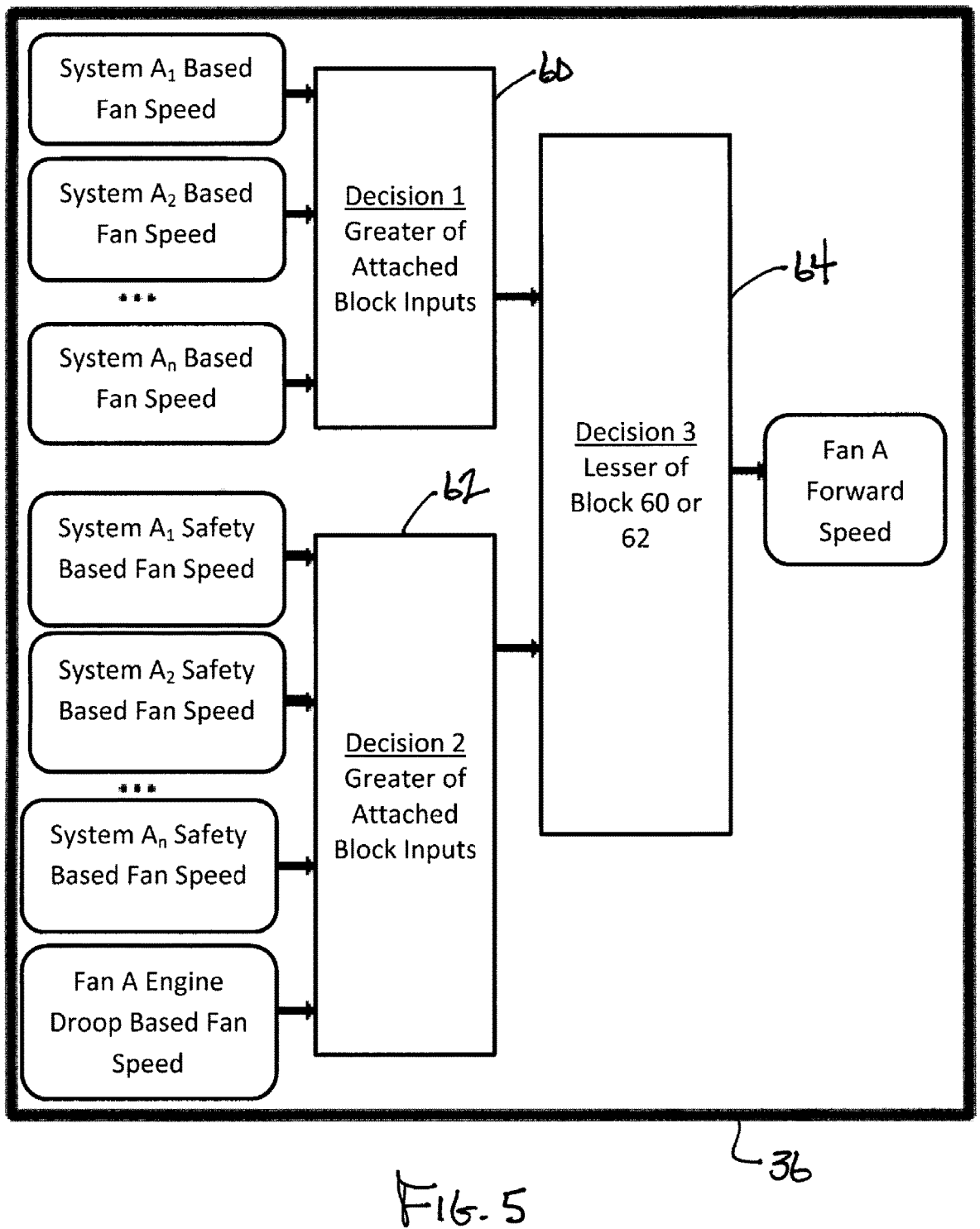
FIG. 5 is a schematic view of a second embodiment of the control system of this invention as applied to the outdoor power equipment unit shown in FIG. 1.

The control system and method of this invention as represented in FIG. 2 could be extended to another embodiment in which a single cooling fan cools any number of systems n in excess of two. Such an embodiment is depicted in FIG. 5. The n systems could comprise engine and hydraulic oil cooling systems among their number as the $A_1$ and $A_2$ systems in FIG. 2, but would include additional systems $A_3$-$A_n$ as shown generically in FIG. 5. The same overall control methodology as shown in FIG. 2 still applies, except now there are more than two operational and safety fan speeds to consider in decision blocks 60 and 62. Note that for each of the additional $A_3$-$A_n$ systems, separate operational and safety speed curves or relationships similar to what is shown in FIG. 3 would have to be derived relating to how each system would vary fan speed in relationship to temperature for both normal operational and safety based conditions.

Figure 6:
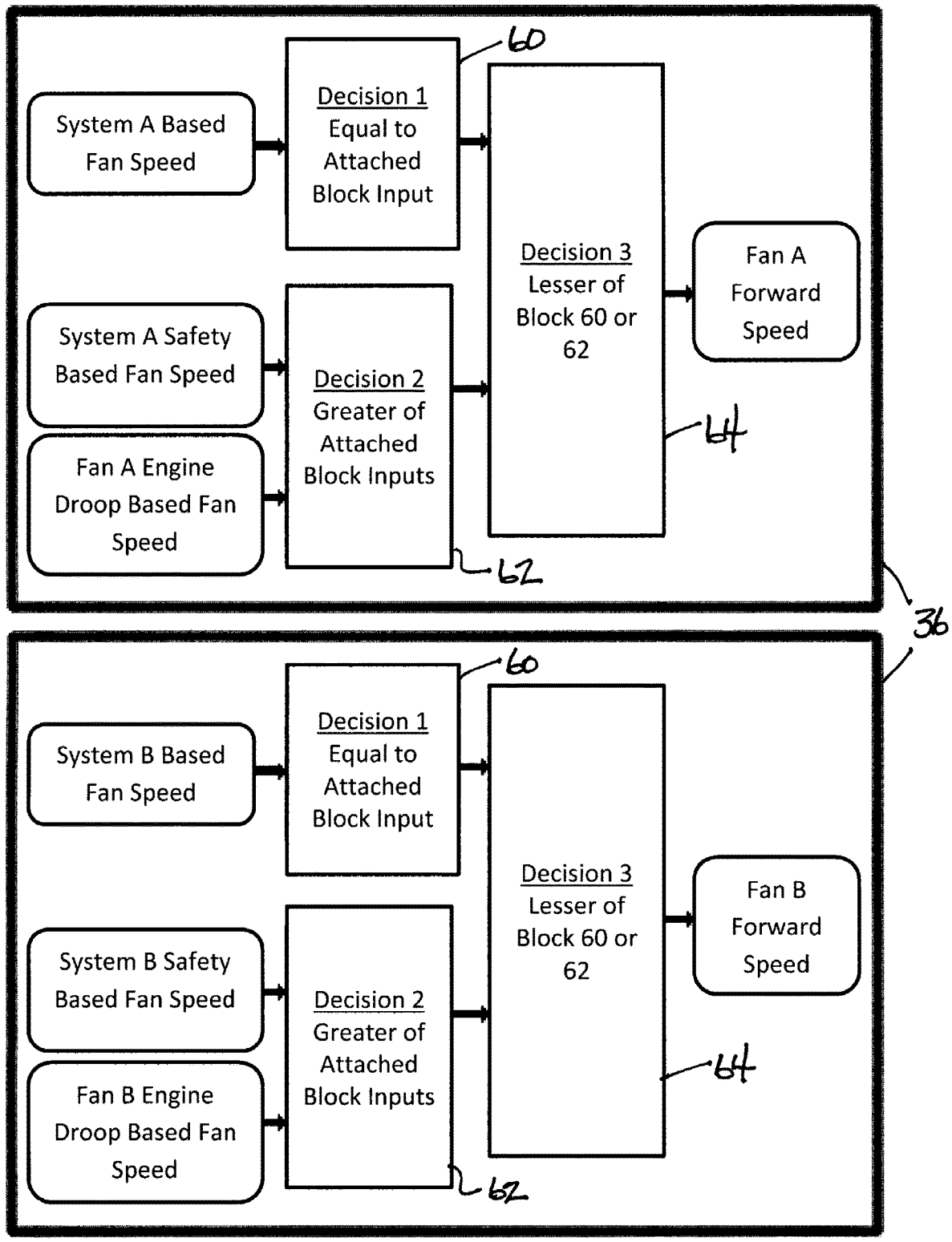
FIG. 6 is a schematic view of a third embodiment of the control system of this invention as applied to the outdoor power equipment unit shown in FIG. 1, particularly illustrating an embodiment using multiple cooling fans.
Figure 7:
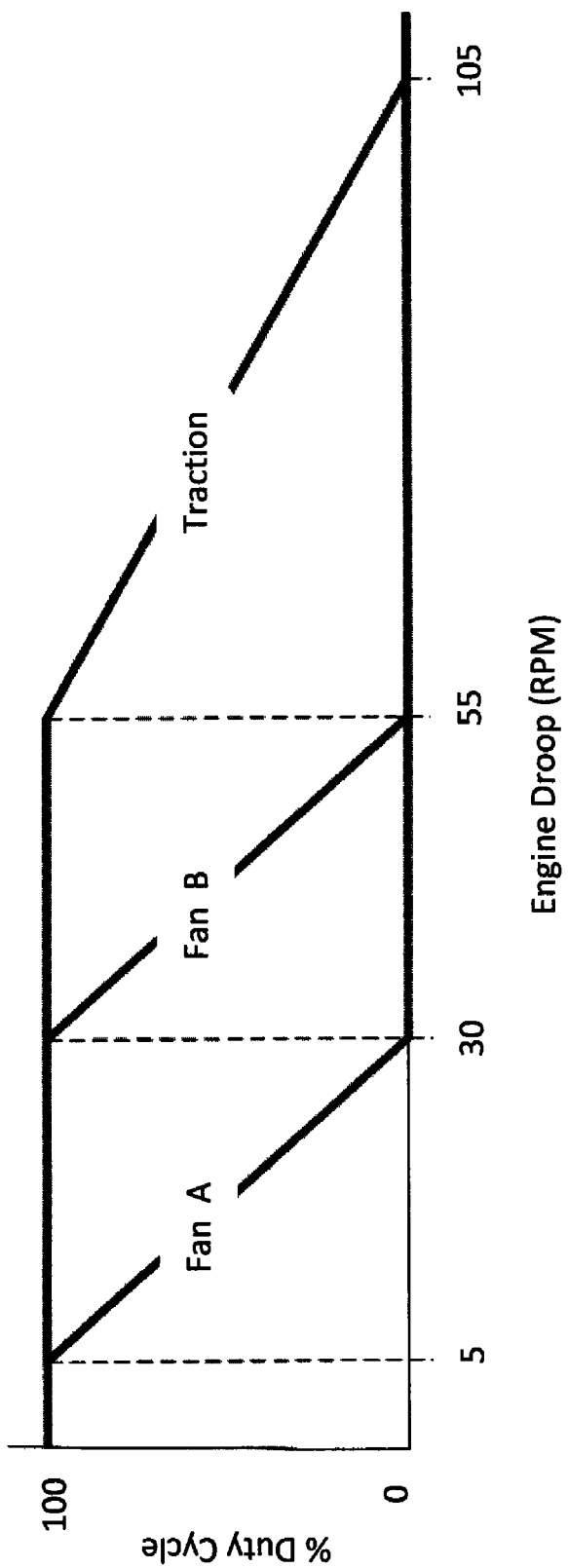
FIG. 7 is a schematic view of a fan speed reduction prioritization scheme used to reduce fan speed of the multiple cooling fan embodiment of FIG. 6 when allowed in response to engine droop.

Referring now to FIGS. 6 and 7, yet another embodiment of this invention comprises a system where there are separate cooling fans for cooling individual components or different groups of components. FIG. 6 discloses a two fan system having a fan A for cooling a first component, which in the example of FIG. 6 will be assumed to be the engine coolant fluid, and a fan B for cooling a second component, which in the example of FIG. 6 will be assumed to be the hydraulic oil. The fan speed for each of fans A and B are determined in a methodology shown in FIG. 6 that is similar to the methodology of FIG. 2, but the fan speed determinations are now entirely independent of one another and apply only to the fan for which the determination has been made. Thus, as shown in FIG. 6, the temperature of a first fluid, e.g. the engine coolant fluid, is monitored and used to generate a fan speed determination for fan A as shown in the upper portion of FIG. 6 while the temperature of a second fluid, e.g. the hydraulic oil, is monitored and used to generate a fan speed determination for fan B as shown in the lower portion of FIG. 6. The question then is how these two independent and separate fan speed determinations are integrated when it comes to what happens when engine droop is also detected, namely what type of fan speed reduction prioritization scheme is used.

FIG. 7 shows one possible fan speed reduction prioritization scheme for the two fan system of FIG. 6. When engine droop reaching a predetermined threshold is reached, e.g. 5 rpm, the speed of fan A is reduced linearly over the next 25 rpm until it reaches zero. If engine droop then passes a total of 30 rpm at the point where fan A has been completely shut off, then the speed of fan B is reduced linearly over the next 25 rpm until total engine droop reaches 55 rpm. At this point, with both fans A and B having been completely shut off in a sequential fashion, then the reduction of traction speed is enabled. Obviously, other fan speed prioritization schemes for fans A and B could be adopted, e.g. the fan speeds could be reduced simultaneously in a proportionate fashion with each fans A and B being slowed equally. However, such fan speed slowing is still governed by the control methodology of FIG. 6. Neither fan A nor fan B can be slowed for engine droop purposes when the safety based fan speed shown for fan A or for fan B is greater than the fan A and fan B engine droop fan speeds respectively.

While the control system and method of this invention have been described in conjunction with a mower in which the work implement comprises a plurality of mower decks, it could be implemented on any outdoor power equipment unit having other types of work implements. In addition, instead of using engine droop as a proxy for an indicator of excessive engine load, some modern engines have internal circuitry that directly calculates and communicates the percentage of load the engine is under at any moment in time. This information is available to the manufacturer of the outdoor power equipment unit over the CAN network typically found in such units. This direct engine load information could be used instead of the engine rpm information used to derive the presence of engine droop. As another alternative, the engine could be equipped with some type of load sensor such as load cell, torque sensor, or other power measurement device to provide another way of obtaining the required engine load information.

Various other modifications will be apparent to those skilled in the art. Thus, the scope of this invention is to be limited only the appended claims.

The invention claimed is:

1. An outdoor power equipment unit, which comprises:
   (a) a frame that carries a prime mover, a ground grooming or working implement, a traction drive, and at least one cooling fan, all of which comprise loads on the prime mover, wherein the at least one cooling fan cools at least one fluid;
   (b) a power management controller on the frame, wherein the controller further stores data representing variable fan speeds for use in cooling the at least one fluid in normal and above normal temperature ranges thereof and for use when prime mover load within a first range above a predetermined value is present, wherein the controller uses a normal temperature fan speed required for cooling the at least one fluid in the normal temperature range unless the prime mover load fan speed is lower in which case the lower prime mover load fan speed is used for as long as the lower prime mover load fan speed remains less than the normal temperature fan speed and/or less than an above normal temperature fan speed required for cooling the at least one fluid in the above normal temperature range; and
   (c) wherein the controller further stores data representing variable operational speeds of the traction drive for use when the prime mover load is within a second range above the predetermined value, and wherein a start point of the first range is closer to the predetermined value than is a start point of the second range such that the controller when use of the prime mover fan speed is permitted in accordance with limitation (b) hereof automatically reduces the prime mover load fan speed from a higher value to a lower value before the controller begins any automatic reduction of the operational speed of the traction drive.

2. The unit of claim 1, wherein engine droop comprising an instantaneous engine speed below a target speed is used to indicate when the prime mover load is above the predetermined value.

3. The unit of claim 1, wherein the at least one cooling fan comprises a single cooling fan for cooling at least first and second fluids, and wherein the normal temperature fan speed is whichever fan speed is highest from a group of fan speeds comprising:
   (a) a first fan speed for cooling the first fluid in the normal temperature range; and
   (b) a second fan speed for cooling the second fluid in the normal temperature range; and wherein the above normal temperature fan speed is whichever fan speed is highest from a group of fan speeds comprising:
   (c) a first fan speed for cooling the first fluid in the above normal temperature range; and
   (d) a second fan speed for cooling the second fluid in the above normal temperature range.

4. The unit of claim 3, wherein the first fluid is engine coolant fluid and the second fluid is hydraulic oil.

5. The unit of claim 1, wherein the at least one cooling fan comprises at least first and second cooling fans with each cooling fan separately cooling at least first and second fluids, and wherein the fan speed determination of limitation (b) of claim 1 is done separately for each of the first and second cooling fans in accordance with temperatures in the first and second fluids.

6. The unit of claim 5, wherein the first fluid is engine coolant fluid and the second fluid is hydraulic oil.

7. The unit of claim 5, further including a fan reduction prioritization scheme for determining fan speed reductions in the first and second cooling fans when permitted when prime mover load above a predetermined value is present.

8. The unit of claim 1, wherein the first and second ranges do not overlap such that the higher value of the prime mover load fan speed is a maximum value thereof and the lower value of the prime mover load fan speed is a minimum value thereof.

9. The unit of claim 8, wherein the maximum value is 100% prime mover load fan speed and the minimum value is 0% prime mover load fan speed.

\* \* \* \* \*

UNITED STATES PATENT AND TRADEMARK OFFICE
CERTIFICATE OF CORRECTION

| | |
|---|---|
| PATENT NO. | : 11,293,333 B2 |
| APPLICATION NO. | : 15/215758 |
| DATED | : April 5, 2022 |
| INVENTOR(S) | : Alexander S. Frick |

It is certified that error appears in the above-identified patent and that said Letters Patent is hereby corrected as shown below:

On the Title Page

Item (60): "62/195,944," should read --62/194,944,--

Signed and Sealed this
Twenty-sixth Day of July, 2022

*Katherine Kelly Vidal*

Katherine Kelly Vidal
*Director of the United States Patent and Trademark Office*